United States Patent [19]

Shorter, Jr.

[11] 4,043,287

[45] * Aug. 23, 1977

[54] APPARATUS FOR CONNECTING FLOATING DOCKS

[76] Inventor: Myron L. Shorter, Jr., 81 Calypso Shores, Ignacio, Calif. 94947

[*] Notice: The portion of the term of this patent subsequent to July 6, 1993, has been disclaimed.

[21] Appl. No.: 653,624

[22] Filed: Jan. 29, 1976

[51] Int. Cl.² .......................................... B63B 35/44
[52] U.S. Cl. ................................................ 114/266
[58] Field of Search ............... 114/.5 R, .5 BD, .5 F, 114/77 R, 77 A, 264, 266, 267; 9/2 C, 2 S; 61/48; 14/27

[56] References Cited

U.S. PATENT DOCUMENTS

| | | | |
|---|---|---|---|
| 2,518,091 | 8/1950 | Stopkevyc | 114/.5 F |
| 2,847,961 | 8/1958 | Meckenstock | 114/77 R |
| 3,091,203 | 5/1963 | Usab | 114/.5 F |
| 3,147,727 | 9/1964 | Weiss, Jr. et al. | 114/.5 F |
| 3,580,202 | 5/1971 | Thompson | 114/.5 F |
| 3,616,774 | 11/1971 | Thompson | 114/.5 F |
| 3,691,974 | 9/1972 | Seiford, Sr. et al. | 114/.5 F |
| 3,967,569 | 7/1976 | Shorter, Jr. | 114/.5 F |

*Primary Examiner*—Trygve M. Blix
*Assistant Examiner*—Jesus D. Sotelo
*Attorney, Agent, or Firm*—Bielen and Peterson

[57] ABSTRACT

Connecting apparatus for floating docks for allowing a versatile modular arrangement which can be altered as desired to accommodate boats of different size, and the like, or to provide for attachment to component structures such as piling collars and braces; the connecting apparatus comprises a plurality of float units with flange structures having flat, horizontal top and bottom connection surfaces and a plurality of equally spaced vertical holes which cooperate with the component structures, the component structures having bracket elements spaced at integral increments on the component structure, interfacing the flat flange surfaces for coincident arrangement with select holes in the flange structure of the float units.

11 Claims, 6 Drawing Figures

APPARATUS FOR CONNECTING FLOATING DOCKS

BACKGROUND OF THE INVENTION

This invention relates to floating wharf structures of the type disclosed in my co-pending application entitled, "Floating Dock", Ser. No. 537,602, filed Dec. 30, 1974 now U.S. Pat. No. 3,967,569.

In the referenced application a means of interconnecting modular float units was described wherein the float units include a flange structure along the sides having a flat top and bottom horizontal mounting surface. Elongated stringers, which extend along a portion of the flange structures of at least two adjacent float units, are mounted against the top and bottom mounting surface of the flange structure. The stringers and flange structures are secured together in sandwich fashion by a plurality of vertical fastening bolts which pass through the stringers and the flange structure. Preferably a tubular sleeve element is installed in the flange structure during fabrication of the float units to define the hole in the flange structure. The advantages of the tubular element are elaborated in the referenced application.

This means of interconnecting adjacent float units has been found to greatly reduce assembly time of wharf structures as well as provide a substantially rigid interconnection of the float units which is not only stronger than previous arrangements, but in the infrequent case of failure, is far simpler to repair or replace.

It has been found that such an arrangement of flange structure and stringers is ideally adaptable to a modular wharf system with greater versatility of assembling float units into a desired pattern or for rearranging already installed system. Furthermore, this particular arrangement of flange structure and stringers permits connection of component structures such as pier collars with a strength not heretofore achievable.

SUMMARY OF THE INVENTION

The floating wharf structure of this invention comprises a plurality of individual float units which are interconnectable to form a walkway. The use of a floating wharf structure allows the structure to rise or fall with the water and hence maintain a constant level with boats moored to the wharf structure. By using multiple individual float units, different arrangements are possible.

The versatility of a modular system of a floating dock structure as described above, can be further enhanced by fabricating the float units with incrementally spaced bolt holes through, and along the entire length of the flange structure. This allows component structures with attachment means correspondingly spaced to be attached at any one of a plurality of positions along the float units. Because of the configuration of the flange structure the attachment means can comprise a bracket element with upper and lower mounting plates that interface the top and bottom mounting surfaces of the flange structure. This arrangement is structurally strong as well as easy to assemble.

For example, to install perpendicular walkways or "fingers" along a main walkway, braces are necessary for the coupling. The triangular braces employed are connected along one side to the finger and along the adjacent right angle side to the main walkway.

Since a plurality of fingers are often used to define slips for various sized craft, it is desireable that the distance between slips be variable in order that boats having different beams can be accommodated without wasting space. To accomplish such, the finger float units and accompanying braces must be located at selected positions along the side of the main walkway without any substantial modification to either the braces or main walkway, since any change must be accomplished with the dock system already installed and functioning. By arranging the vertical fastening means along the entire length of the flange structures of the float units at predefined incremental distances, and adopting integral or multiple integral spacing for the attachment means of the braces or other coupling components, the finger float units can be located at any incremental position along the main walkway.

In a similar manner, other component structures, such as piling collars, which fasten the floating dock to a stationary vertical post or piling, may be rigidly attached to the float units at the flange structure. These and other features will become apparent from the detailed description which follows.

DETAILED DESCRIPTION OF THE PREFERRED EMBODIMENT

Figure 1:
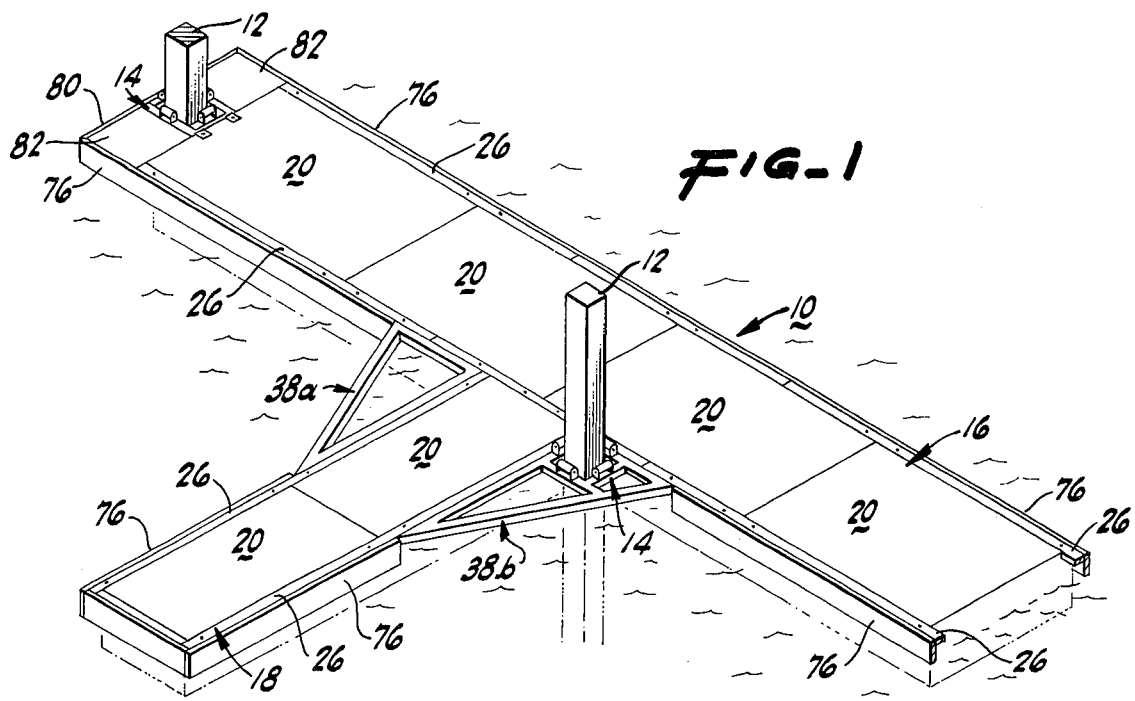
FIG. 1 is a perspective view of the modular floating dock structure.

Referring to the perspective view of FIG. 1, a floating dock structure designated generally by the reference numeral 10 is shown. The floating dock structure is anchored to pilings 12 by collars 14 which permit the floating dock to rise and fall with changes in the water level without becoming displaced transversely. The floating dock structure or wharf structure illustrated is comprised of a main walkway 16 and a perpendicular finger 18. It is to be understood that the simple arrangement shown is merely exemplar, and more extensive arrangements are contemplated.

Both the main walkway 16 and finger 18 are comprised of a plurality of interconnected float units 20. As a matter of economy in expense and space, the float units of the finger are narrower than the units of the main walkway since it is expected that a plurality of spaced fingers will define individual boat slips. The walkways of the fingers for the individual slips would thereby not require the necessary width of the common main walkway.

Figure 3:
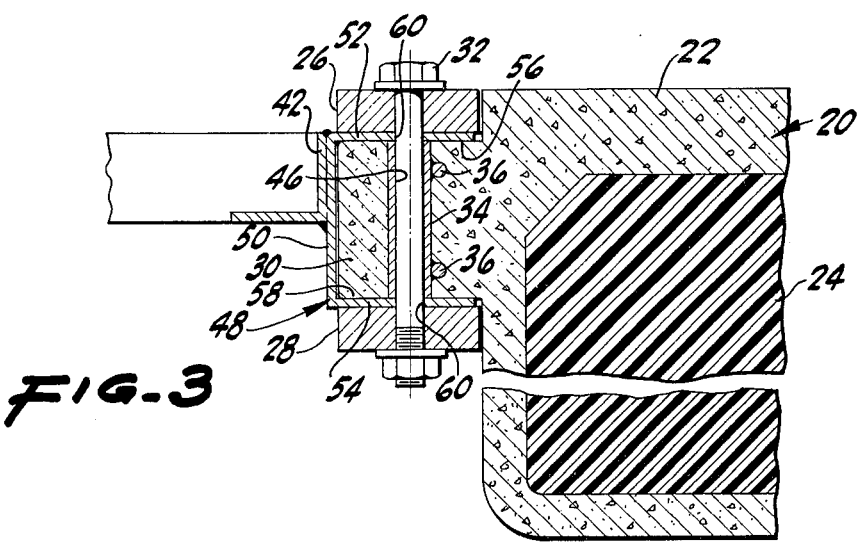
FIG. 3 is a cross sectional view taken on the lines 3—3 in FIG. 2.

The individual float units 20, as illustrated in the cross sectional view of FIG. 3, are preferably fabricated with a concrete shell 22 which encases a polyurethane foam float core 24. While concrete structures and structures of other material may be fabricated as a hollow shell, the use of a foam core is preferred to prevent the sinking of the float unit if punctured or cracked.

The individual float units are consecutively interconnected by a novel flange and stringer arrangement which is the subject of the referenced application. Essentially, as shown in FIGS. 1 and 3, a series of elongated top stringers 26 and bottom stringers 28 are mounted to a flange structure 30 projecting from the side of the float units 20. The stringers are generally mounted against a horizontal top and bottom surface on the flange structure along at least a portion of two adjacent float units and are secured together in sandwich fashion, by a vertical drop-through bolt assembly 32.

A tubular, steel sleeve element 34 imbedded in the flange structure 30 provides a hole guide through the flange structure as well as a means of distributing forces in the sleeve and providing an anchor point for reinforcing rods 36 welded to the sleeve element.

Connection of the float finger 18 to the main walkway 16 is accomplished by triangular braces 38a and 38b. These braces utilize a connection system with the dock structure which is the general subject of this invention. This system is also used to connect other auxiliary component structures such as the piling collar 14 which as illustrated in FIG. 1 may comprise a separate component i.e., shown located at the end of the main walkway 16 as well as a combination component, as shown in combination with the triangular brace 38b. Because of the high structural requirements of the braces and piling collars, these are utilized to illustrate the connection system, which may naturally be employed for other components where a strong rigid connection to the dock structure is required or desired.

Figure 2:
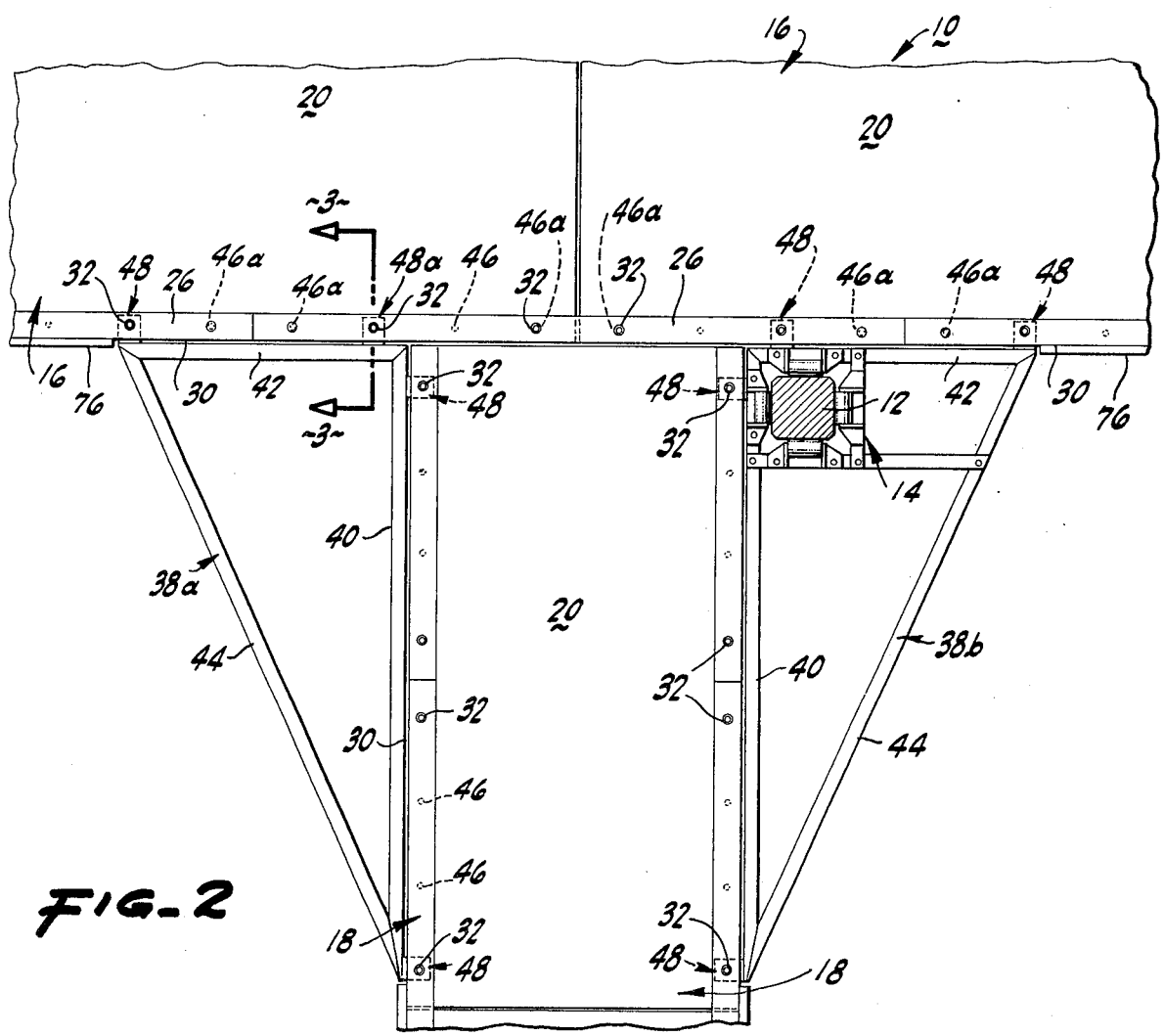
FIG. 2 is an enlarged fragmentary plan view of the dock structure of FIG. 1.
Figure 4:
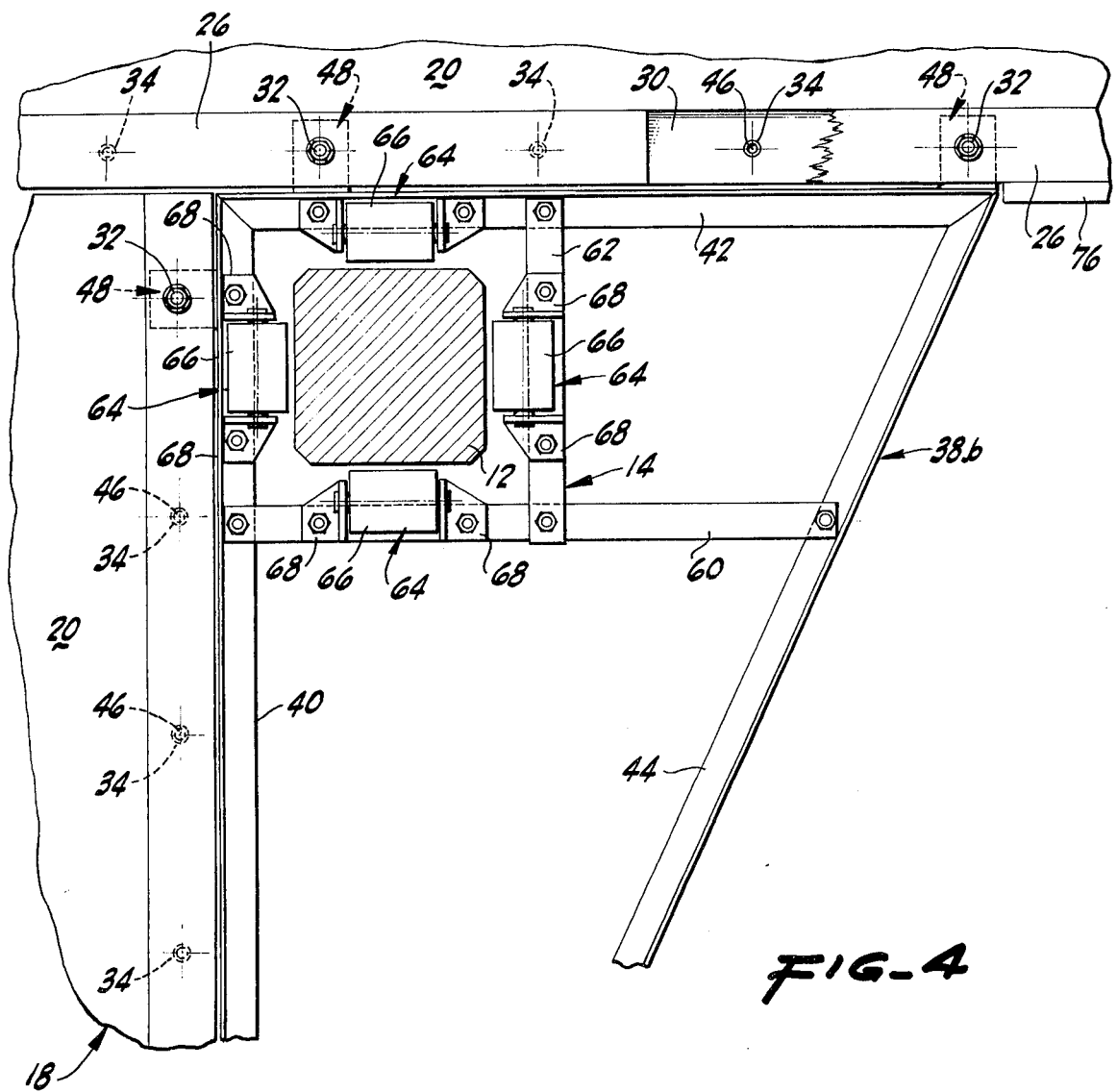
FIG. 4 is an enlarged fragmentary plan view of a portion of the structure shown in FIG. 2.

Referring now to the more detailed plan view of FIGS. 2 and 4, with regard to float units 20, the braces 38a and 38b, include a flange structure 30 which projects from the side of the float units. In FIG. 2 the flange structure is shown overlaid with a series of top stringers 26. The triangular braces 38a and 38b are constructed from steel angle irons with one elongated side element 40 paralleling the flange structure of the dock finger 18 and a shorter side element 42, welded perpendicular to the elongated element 40, paralleling the flange structures 30 of the main walkway 16. A diagonal or hypotenuse element 44 is welded to and interconnects the free ends of the two side elements 40 and 42 creating a rigid frame.

At equally spaced intervals along the flange structures of both the main walkway 16 and the finger, is an incremental series of connection holes 46 which are constructed in the manner shown in FIG. 3 and arranged as shown in FIG. 2. Each hole 46, represents a preexisting potential connection point for a component structure. While certain of the holes 46a naturally form the tiedown points for the stringers in interconnecting a series of float units, use of all the holes for this function is not necessary.

Rigidly attached to the side elements 40 and 42 of the braces by a butt weld are a set of U-shaped brackets 48, two on each of the respective side elements 40 and 42. The brackets 48 are spaced an integer multiple of the distance between adjacent holes. In this manner the walkway finger with attached braces can be positioned at any incremental location along the side of the main walkway and the brackets 48 on the short side elements 40 will align with connection holes.

The brackets as illustrated by the exemplar element 48a of FIG. 2 shown in cross section in FIG. 3, are comprised of a flat vertical center plate 50 integral with a flat horizontal top plate 52 and a flat horizontal bottom plate 54. The brackets 48 may be fabricated from a single plate by bending or by separate plates by welding. The brackets are constructed such that the top plate 52 interfaces the top mounting or connecting surface 56 of the flange structure 30 and the bottom plate 54 interfaces the bottom mounting surface 58. The top and bottom plates of the bracket have holes 60 which are coincident with the holes 46 through the flange structure formed by the vertically oriented tubular sleeve element 34. The bolt assembly 32 extends through the top stringer 26, the top plate 52, the flange structure 30, the bottom plate 54 and the bottom stringer 28, securing the elements together in compression.

The four brackets 48 on each of the two braces 38a and 38b rigidly connect the finger 18 to the main walkway. A similar arrangement may be utilized for interconnection of two T'd main walkways, right angle turns or other conventional configuration with minor modifications.

While the braces may be simply open as shown in FIG. 1 they may, of course, be covered with a wood or even concrete overlay to increase the walking surface. Also, the brace may advantageously form the structural base for a piling collar 14 as shown in FIG. 1 and in greater detail in FIG. 4.

Referring to FIG. 4, the brace 38b provides the basic support with the addition of cross members 60 and 62 for a set of four roller assemblies 64 which are bolted to the side elements 40 and 42 and the cross members 60 and 62.

The roller assemblies are arranged such that rollers 66 mounted in brackets 68 are projected over the edge of the side elements and cross members for exclusive contact with a generally square concrete piling 12. The collar 14, here formed by the side elements and cross members, together with the roller assemblies, restricts any lateral movement of the floating dock structure. The rollers provide a substantially unrestricted vertical movement even though substantial lateral tidal or wind forces are applied against the dock structure.

Figure 5:
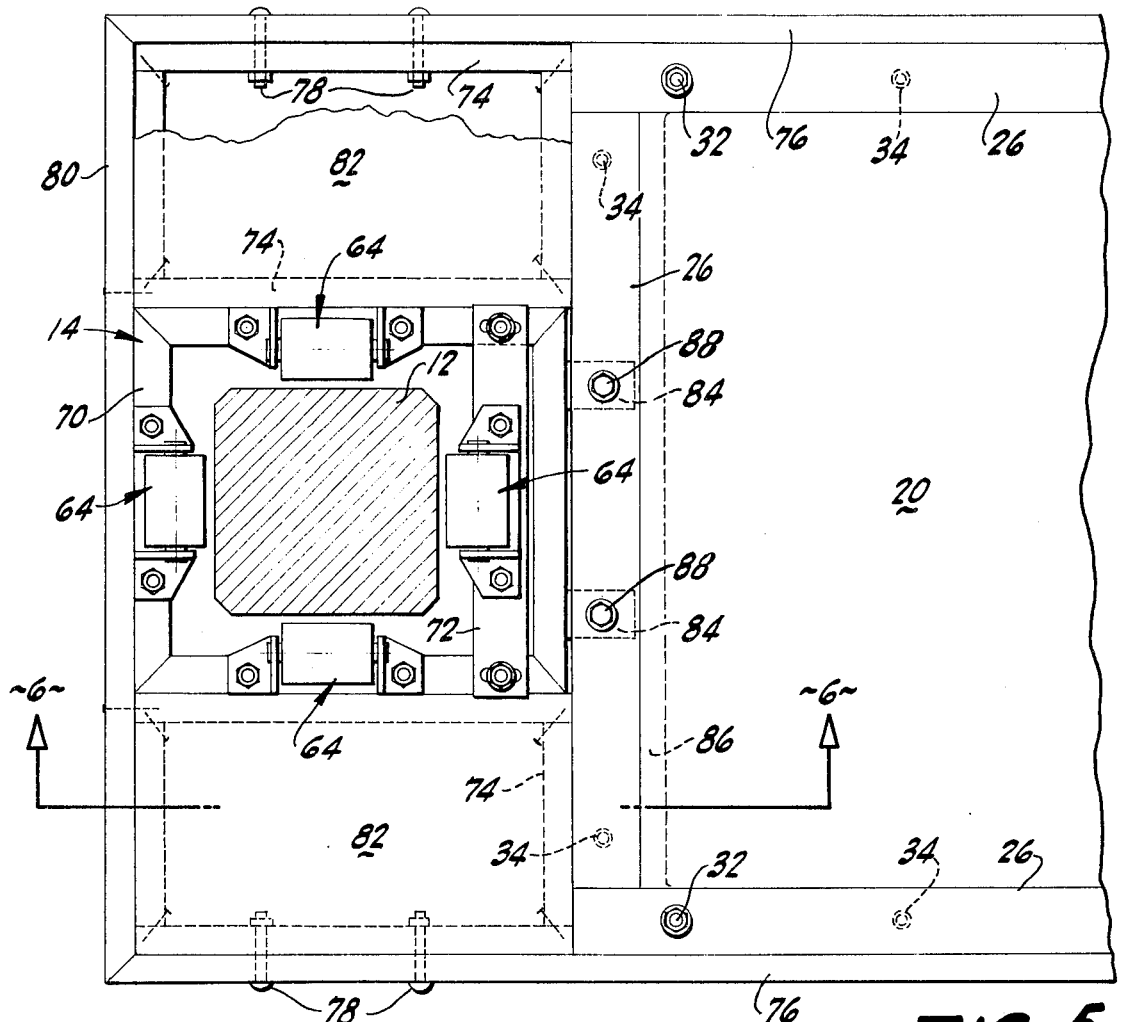
FIG. 5 is an enlarged fragmentary plan view of a second portion of the structure shown in FIG. 2.
Figure 6:
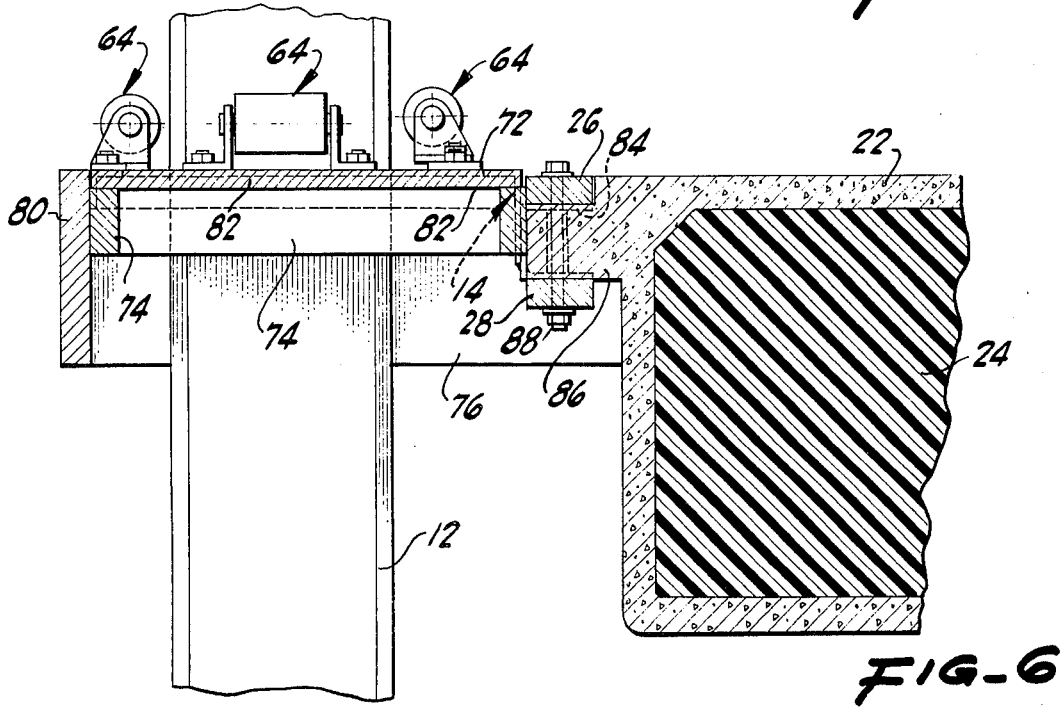
FIG. 6 is a cross sectional view taken on the lines 5—5 in FIG. 5.

Referring the FIGS. 5 and 6 a second collar structure is illustrated at the end of the main walkway for connecting the walkway 16 to a stationary piling 12. The collar 14 is formed of a four sided steel frame 70 with three roller assemblies 64 bolted to three sides of the frame 70 and one roller assembly 64 bolted to a cross plate 72. The collar frame 14 is mounted within a wooden frame 74 on each side of the collar 14 which are in turn attached to extensions of wooden buffer rails 76 by carriage bolts 78. An end buffer rail 80 provides a finished appearance and protective plate to the walkway. To utilize the additional area around the collar, a plywood cover 82 is attached to the wooden frames 72.

The frame 70 of the collar is attached to the float unit by a pair of spaced brackets 84 which have a horizontal flat plate portion which interfaces the top surface of a flange structure 86 at the end of the walkway 16, and a horizontal flat plate portion which interfaces the bottom surface of the flange structure. A bolt assembly 88 through both portions of the bracket and through the flange structure couples the collar 14 to the float unit 20. Preferably the distance between the brackets 84 is equal to the incremental distance between the holes 46 through the flange structures 30 along the sides of the float units such that if desired, a collar structure substantially as shown in FIGS. 5 and 6 can be attached at virtually any incremental position along the sides of the float units by alignment of the bracket of the collar with selected connection holes 46 in the flange structures of the float units.

The modular system of a floating dock comprised of an arrangement of module float units is greatly enhanced in flexibility by an interconnection means that is standardized not only in the interconnection of individual float units, but complementary components as well.

While in the foregoing specification an embodiment of the invention has been set forth in considerable detail for purposes of making a complete disclosure thereof, it will be apparent to those skilled in the art that numerous changes may be made in such details without departing from the spirit and principles of the inventions.

What is claimed is:

1. In a modular floating dock comprised of coupled individual float units each constructed with a substantially rectangular shell with opposed sidewalls and end walls, and top and a bottom, a means for connecting component apparatus to the modular floating dock comprising;
   a. a flange structure projecting from one of the walls of the float units proximate the top of the float units, said flange structure having a horizontal top mounting surface and a horizontal bottom mounting surface displaced a predetermined distance from the top mounting surface;
   b. at least one hole vertically extending through said flange structure from said top mounting surface to said bottom mounting surface;
   c. at least one bracket element having a thin horizontal top plate and thin horizontal bottom plate displaced said predetermined distance from the top plate, said bracket element having at least one hole in said top plate and at least one hole in said bottom plate aligned with said hole in said top plate;
   d. component apparatus connected to said bracket element, and;
   e. interconnection means vertically extending through said hole in said top plate of said bracket elements, said hole in said flange structure, and said hole in said bottom plate when said bracket element is engaged on said flange structure for interconnecting said bracket element and said flange structure, said interconnection means including means for securing said bracket plates and said flange structure together in compression.

2. The apparatus of claim 1 wherein a plurality of holes vertically extend through said flange structure, said holes being incrementally spaced along said flange structure in series and wherein at least one bracket has at least two pairs of holes spaced an integral number of increments apart whereby said bracket element holes are alignable with at least two spaced holes in said flange structure.

3. The apparatus of claim 2 wherein a plurality float units are coupled together, each having a flange structure, which when said units are coupled, forms a continuous flange structure along the length of said coupled units wherein each flange structure has a plurality of holes vertically extending through said flange structure, said holes being arranged such that they are incrementally spaced along the entire length of the continuous flange structure formed.

4. The apparatus of claim 3 wherein at least two bracket elements are spaced an integral number of increments apart, said holes in said bracket elements being alignable with at least two spaced holes in said continuous flanges structure, said bracket elements being connected to said component apparatus.

5. A modular floating dock system comprised of coupled individual float units each constructed with a substantially rectangular shell with opposed side walls and end walls, and a top and a bottom, the floating dock system having a standardized means for connecting component apparatus to allow versatile arrangements of the system comprising:
   a. flange structure projecting from at least one of the walls of the float units having a horizontal top mounting surface and a horizontal bottom mounting surface displaced a predetermined distance from the top mounting surface; wherein a plurality of float units are coupled together, each having a flange structure, which when said units are coupled, forms a continuous flange structure along the length of said coupled units;
   b. a plurality of holes vertically extending through said flange structure from said top mounting surface to said bottom mounting surface, said holes being arranged such that they are equally spaced in a series of increments along the entire length of the continuous flange structure formed;
   c. at least two bracket elements each having a top plate and a bottom plate displaced said predetermined distance from the top plate, said bracket elements each having one hole in said bottom plate aligned with said hole in said top plate, said bracket elements being spaced with holes an integral number of increments apart, said holes in said bracket elements being alignable with at least two spaced holes in said continuous flange structure;
   d. interconnection means vertically extending through the holes in said top plates of said bracket elements, said holes in said flange structures, and said holes in said bottom plates when said bracket elements are engaged on said flange structures for interconnecting said bracket elements and said flange structures, said interconnection means including means for securing said bracket plates and said flange structures together in compression; and,
   e. component apparatus connected to said bracket elements.

6. The apparatus of claim 5 wherein said component apparatus comprises a brace means for connecting at least one float unit to the flange structure of said float units.

7. The apparatus of claim 5 wherein said component apparatus comprises a piling collar.

8. The apparatus of claim 5 in combination with an upper stringer mounted to the top mounting surface of the flange structure over said top plate of said bracket element, and a lower stringer mounted to the bottom mounting surface of the flange structure over said bottom plate of said bracket element, said upper and lower stringers having holes aligned with said aligned holes in said bracket element and flange structure, wherein said interconnection means extends through said holes in said stringers to connect said stringers, said bracket, and said flange structure together in compression.

9. The apparatus of claim 8 wherein said interconnection means comprises a bolt assembly.

10. The apparatus of claim 5 wherein said holes vertically extending through said flange structure are defined by a tubular sleeve element imbedded in said flange structure.

11. The apparatus of claim 10 wherein said flange structure comprises further reinforcing rods in said flange structure fastened to said tubular sleeve element.

* * * * *